US006935957B1

(12) United States Patent
Yates et al.

(10) Patent No.: US 6,935,957 B1
(45) Date of Patent: Aug. 30, 2005

(54) METHOD AND SYSTEM FOR WIRELESS VALIDATION OF GAMING VOUCHERS

(75) Inventors: Craig A. Yates, San Diego, CA (US); Lee M. Skelley, San Diego, CA (US); Donne D. Grable, Santee, CA (US)

(73) Assignee: Barona Tribal Gaming Authority, Lakeside, CA (US)

( * ) Notice: Subject to any disclaimer, the term of this patent is extended or adjusted under 35 U.S.C. 154(b) by 0 days.

(21) Appl. No.: 09/858,157

(22) Filed: May 14, 2001

(51) Int. Cl.[7] .............................................. A63F 13/00
(52) U.S. Cl. .......................................... 463/42; 463/25
(58) Field of Search ............................. 463/12, 29, 25, 463/40, 41, 42

(56) References Cited

U.S. PATENT DOCUMENTS

| | | | | |
|---|---|---|---|---|
| 5,283,734 A | | 2/1994 | Von Kohorn | |
| 5,611,730 A | | 3/1997 | Weiss | |
| 5,770,533 A | * | 6/1998 | Franchi | 463/42 |
| 5,820,459 A | | 10/1998 | Acres et al. | |
| 5,871,398 A | * | 2/1999 | Schneier et al. | 463/16 |
| 6,015,344 A | | 1/2000 | Kelly et al. | |
| 6,023,688 A | | 2/2000 | Ramachandran et al. | |
| 6,048,269 A | * | 4/2000 | Burns et al. | 463/25 |
| 6,110,044 A | | 8/2000 | Stern | |
| 6,113,492 A | | 9/2000 | Walker et al. | |
| 6,117,013 A | | 9/2000 | Eiba | 463/41 |
| 6,319,125 B1 | * | 11/2001 | Acres | 463/25 |
| 6,394,907 B1 | * | 5/2002 | Rowe | 463/42 |
| 2001/0044337 A1 | | 11/2001 | Rowe et al. | 463/29 |
| 2002/0098888 A1 | | 7/2002 | Rowe et al. | 463/39 |
| 2002/0103027 A1 | | 8/2002 | Rowe et al. | 463/39 |

FOREIGN PATENT DOCUMENTS

DE 195 02 613 A1 8/1996

* cited by examiner

*Primary Examiner*—Kim Nguyen
(74) *Attorney, Agent, or Firm*—Irell & Manella LLP

(57) ABSTRACT

A system and method for wireless validation of gaming vouchers output from electronic gaming machines includes a number of electronic gaming machines physically connected to a centralized computer which receives and stores game transaction information, including records of printed vouchers and pay-out amounts relating thereto. Voucher records are stored by the centralized computer in a voucher database. When a player desires to cash-out a voucher, the voucher information is entered by an attendant in a wireless, portable computer device, and the information is relayed to a remote wireless interface connected to the centralized computer, which invokes a verification application program. The verification application program verifies that the voucher is valid and not paid out by checking the voucher database. It then updates the voucher record to indicate that the voucher has been paid, reads out the pay-out amount for the voucher, and transmits the pay-out amount to the wireless, portable computer device, where it is displayed. If a voucher is not valid or already paid out, a denial message is transmitted to the wireless, portable computer device. The system may include a primary network and a secondary network with redundant, cross-referenced voucher databases, and one of the two networks may be responsible for managing the wireless voucher requests.

12 Claims, 6 Drawing Sheets

METHOD AND SYSTEM FOR WIRELESS VALIDATION OF GAMING VOUCHERS

BACKGROUND OF THE INVENTION

1) Field of the Invention

The field of the present invention relates to the gaming industry and, more particularly, to systems and methods for validation of gaming vouchers in connection with electronic gaming machines.

2) Background

Casino gaming continues to grow in popularity, bringing about steady growth in both the number and size of casinos. At the same time, technology for electronic gaming machines has continued to improve. Gaming machines now typically are configured with microprocessor-based intelligence for handling gaming functions and, in some cases, for handling communication with a central computer or network that manages a large number of gaming machines.

Casinos and gaming establishments have traditionally relied upon coin-operated gaming devices. Such coin-operated gaming devices have a number of drawbacks or limitations. For example, they generally require customers to carry around large numbers of coins, which can be inconvenient or burdensome to customers.

To increase convenience to players, casinos and gaming establishments have begun to explore and develop cashless gaming techniques, which allow players to game without using chips or coins. One technique that has been developed is the use of printed pay-out vouchers in place of chips or coins when a player is ready to "cash out" his or her winnings (also referred to as the "purse") and either move to another gaming machine or trade in the winnings for cash at a cashier. Some machines may provide the player with the option of receiving the pay-out either as chips or as a printed voucher. At the completion of a gaming session, a player selects pay-out, causing a printer integrated with the gaming machine to dispense a printed pay-out voucher having a voucher code and a payment amount. The player then takes the voucher to a cashier, who cashes the voucher.

One example of a system using coupon or ticket printers to perform cash-out is described in International Patent Application WO 98/59311 published Dec. 30, 1998, hereby incorporated by reference as if set forth fully herein.

Cashless gaming systems are often deployed in an environment in which the gaming devices are connected to and controlled by a central computer, which serves as the host for a local area network, and such systems are referred to as "on-line" systems. Accurate centralized accounting in on-line cashless gaming systems is highly important, because when machines can be played with coins or with credit (via a cashless technique), the number of coins in and out will not necessarily reflect the total intake or payout of a gaming device. Where printed vouchers are used, each printed voucher pay-out is typically transmitted to the central computer, which is thereby able to keep a running account of the activity at each gaming device. Voucher records are stored in a database in the central computer system, and reconciled against cashed vouchers which are presented to cashiers at the gaming establishment.

Some gaming establishments have attempted to make the cash-out process more convenient by providing self-serve cashier machines. A player takes a printed pay-out voucher to a self-serve cashier machine and presents it to a scanner. The scanner reads the ticket, and the self-serve cashier machine sends the voucher data over cable connections to a central computer which verifies the validity of the voucher.

The central computer sends a voucher verification indication back to the self-serve cashier machine, which then pays out the appropriate amount to the player, much like an automated teller machine (ATM) at a bank.

While printed vouchers have increased convenience to players in some respects, neither of the existing methods allow cashing of tickets on the floor of the gaming establishment, where it would be most convenient to players. Instead, players need to walk over to a cashier or find a self-serve cashier machine. With gaming establishments growing in size and becoming more complicated in floor layout, it can become an annoyance to players to have to locate the cashier or self-serve cashier machine in order to get their pay-out.

On the other hand, cashing vouchers other than at a cashier or a self-serve cashier machine may be risky, and fraught with potential fraud concerns. To address the possibility of fraud, techniques for watermarking have developed, as well as encoding the voucher data on the ticket. However, these techniques are physical to the ticket, and may not protect against other types of fraud, such as duplicate tickets.

It would therefore be advantageous to provide a convenient and efficient technique for validating gaming vouchers that can be used on the floor of a gaming establishment, while at the same time reducing the risk of fraud or error.

SUMMARY OF THE INVENTION

The invention in one aspect provides a system and method for wireless validation of gaming vouchers as may be output from electronic gaming machines. In a typical environment in which the invention may be practiced, a number of electronic gaming machines are physically connected to a centralized computer or network which receives and stores game transaction information. When an electronic gaming machine prints out or otherwise dispenses a voucher to a player, a record of the voucher transaction is transmitted to the centralized computer or network and stored in a voucher database. The voucher may be redeemed by a player through a wireless voucher verification process as described herein.

In one embodiment, a system for validating gaming vouchers printed or otherwise dispensed by an electronic gaming machine includes a wireless, portable computer device having a display, a data input interface, and a radio transceiver. The portable computer device may be carried by an operator patrolling the floor of a gaming establishment. A player receiving a voucher from an electronic gaming machine may provide the voucher to the operator for validation and pay-out. The operator inputs ticket identifying information into the wireless, portable computer device (in any of a variety of manners), and the information is relayed to a remote radio transceiver connected to the centralized computer or network. The centralized computer or network detects the transmission of the voucher validation request and invokes a verification application program. The verification application program verifies that the voucher is valid, preferably by checking the voucher identification information against the corresponding information stored in the voucher database. If the voucher is not valid, the centralized computer or network transmits, via the remote radio transceiver, a return message indicating to the wireless, portable computer device that the voucher is invalid and pay-out will not occur. If, on the other hand, the voucher is valid, then the centralized computer or network transmits, via the remote radio transceiver, a return message indicating to the wireless, portable computer device that pay-out may occur, and further transmits the stored payment amount. The return message and, if applicable, the payment amount are displayed on the wireless, portable computer device for the convenience of the operator.

Preferably, once the voucher payment authorization is transmitted back to the wireless, portable computer device, the verification application program marks the voucher record as paid, to avoid paying out more than once on a single voucher.

Further embodiments, variations and enhancements are also disclosed herein.

DETAILED DESCRIPTION OF PREFERRED EMBODIMENTS

Figure 1:
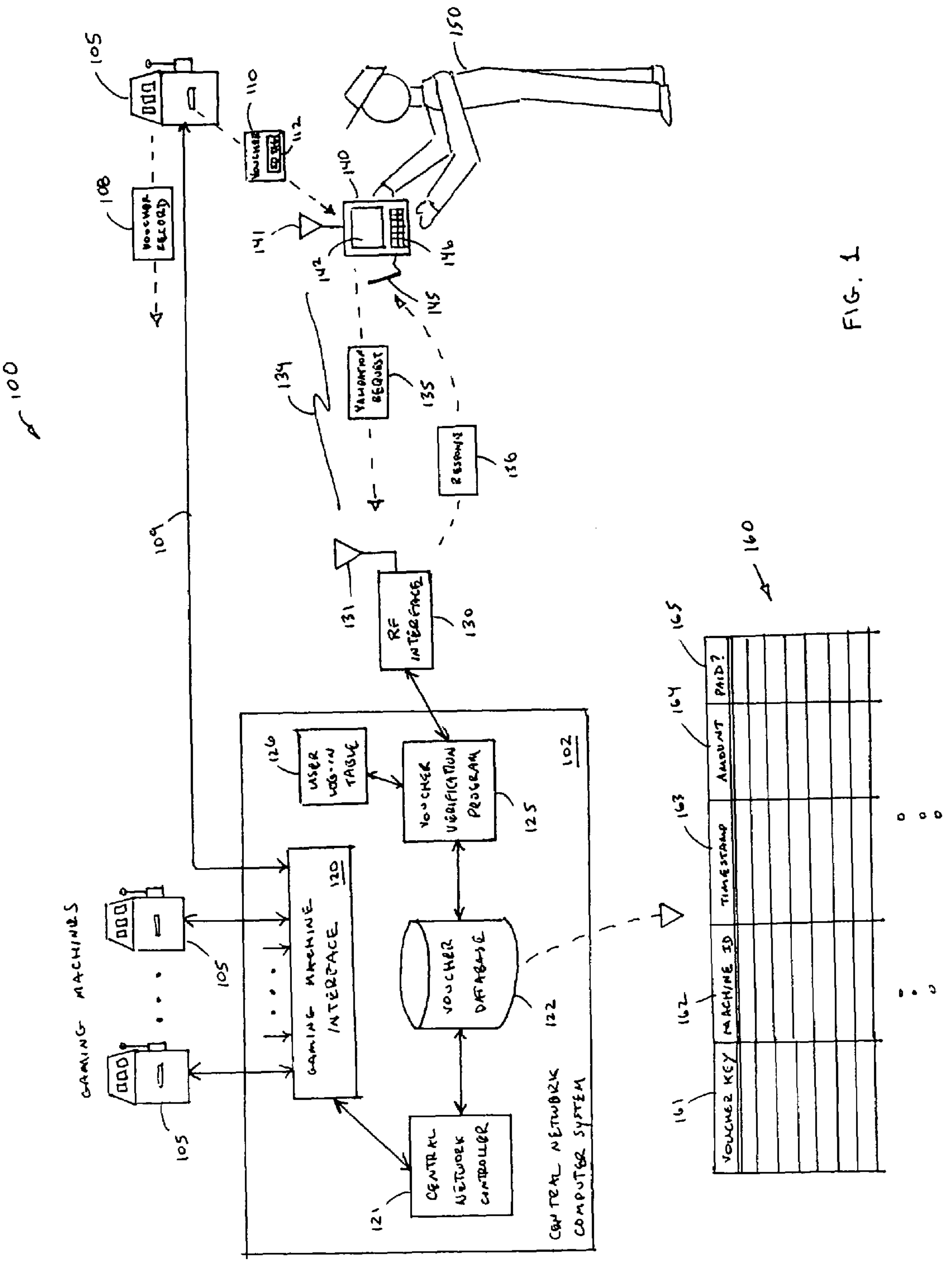
FIG. 1 is a block diagram of a system for wireless validation of payment vouchers as may be printed out or otherwise dispensed by an electronic gaming machine.

FIG. 1 is a block diagram of a gaming system 100 for wireless validation of payment vouchers as may be printed out or otherwise dispensed by an electronic gaming machine. As illustrated in FIG. 1, the gaming system 100 includes a number of electronic gaming machines 105 physically connected to a central network computer system 102, which receives and stores on-going game transaction information according to protocols well known in the art of electronic gaming. The central network computer system 102 preferably comprises a gaming machine interface 120 which connects to the electronic gaming machines 105 and handles the exchange of information therewith. A central network controller 121 controls operation of various functions of the central network computer system 102, including the storage of voucher data in a voucher database 122.

The central network computer system 102 may communicate with the various gaming machines 105 using any standard (or non-standard) gaming device interface protocol, such as SAS or SDS, for example, both of which are conventional and well known in the field of gaming devices.

The central network computer system 102 is connected to a wireless (e.g., radio frequency or RF) interface 130, and comprises a voucher verification application program 125 for authorizing voucher payment as further described herein. The voucher verification application program 125 interacts with a user log-in table 126 stored in the central network computer system 102. The RF interface 130 communicates with a wireless, portable computer device 140 over a wireless communication path 134 in order to effectuate wireless validation of vouchers according to the various techniques as described in more detail herein.

The wireless, portable computer device 140 may include a screen display 142 and a data input interface (such as a keyboard or keypad 146 and/or a stylus 145). The wireless, portable computer device 140 preferably includes a radio transceiver and an antenna 141 for facilitating wireless communication. The wireless, portable computer device 140 may conveniently be embodied as, for example, a wireless personal digital assistant (PDA) as commercially available from any of a variety of manufacturers, programmed with software to perform the voucher validation operations as described herein. As just one example, the wireless, portable computer device 140 may comprise a PalmPilot® programmed with appropriate software.

The wireless, portable computer device 140 may communicate with the network RF interface 130 using any type of wireless protocol. A preferred wireless protocol has characteristics of being low-power, robust, error-resistant and secure, and may be based upon, for example, a spread spectrum communication technique. Alternatively, narrowband communication techniques or hybrid communication techniques may be utilized. Encryption of data communicated between the portable computer device 140 and the network RF interface 130 may be used to increase the security of communicating wireless data. To reduce the effect of errors during wireless transmission of data, various error correction techniques (e.g., forward error correction, or FEC, techniques) may be employed.

In the wireless voucher validation system of FIG. 1, a large number of wireless, portable computer devices 140 may be carried and used by various attendants 150, particularly in large gaming establishments. It is possible that a wireless, portable computer device 140 may become lost or stolen. Therefore, it is preferred that a mechanism be employed to enhance the security of operating the wireless voucher validation system 100 and, specifically, to ensure the integrity of voucher validation requests transmitted to the central network computer system 102. Along these lines, the user log-in table 126 is maintained at the central network computer system 102 as a security feature to track current device activity. In a preferred embodiment, a wireless, portable computer device 140 cannot be used for a wireless voucher validation transaction until appropriate authentication of the user and device is carried out. In one implementation, for example, the user log-in table 126 comprises a set of table record entries, one table record entry for each wireless, portable computer device 140. An attendant or operator 150 who will be using the device 140 first must log in by entering a user ID and a correct password. Authentication of the user ID and password may be carried out locally at the wireless, portable computer device 140, but preferably is carried out at the central computer network system 102, by a wireless exchange of information between the wireless, portable computer device 140 and the RF interface 130 of the central computer network system 102.

Once an attendant 150 has successfully logged on, the user log-in table 126 is updated to reflect that, for the particular device ID, a particular user (identified by his or her user ID) is logged on and is operating the device 140. The information in the user log-in table 126 is continually updated as attendants 150 log on and log off. In a preferred embodiment, the voucher verification application program 125 maintains a schedule of permissible hours of duty of each possible user (i.e., attendant 150). When an attendant 150 logs on (which may be done by entry of a user ID and password, or else by scanning, with an optical reader built in to the wireless, portable computer device 140, a user badge with a bar code or other machine readable indicia having the user ID), the information is preferably transmitted to the central network computer system 140, to verify that the user exists (based on the user (ID), that the user has sufficient privileges to use the wireless, portable computer device 440, and that the user is in the midst of an active "session"—that is, the user is operating the device 440 during permissible hours, as stored in the user log-in table 426. If any of the security criteria are not met, access is denied.

Moreover, whenever a voucher validation request is received, the voucher verification application program 125 may check to make sure that a properly logged on attendant is using the device 140 (i.e., by confirming the existence of a valid user ID in the user log-in table for the particular device 140), and also to make sure that the attendant 150 is using the device during the attendant's permissible hours of duty. In one implementation, when an attendant's permissible hours of duty have expired, the user log-in table 126 is automatically updated to indicate that no authorized user is currently using the particular device 140. Preferably, a system administrator can update the schedule of permissible hours of duty in real-time, to adjust the schedule when, e.g., attendants change their work hours or need to work overtime.

Figure 2:
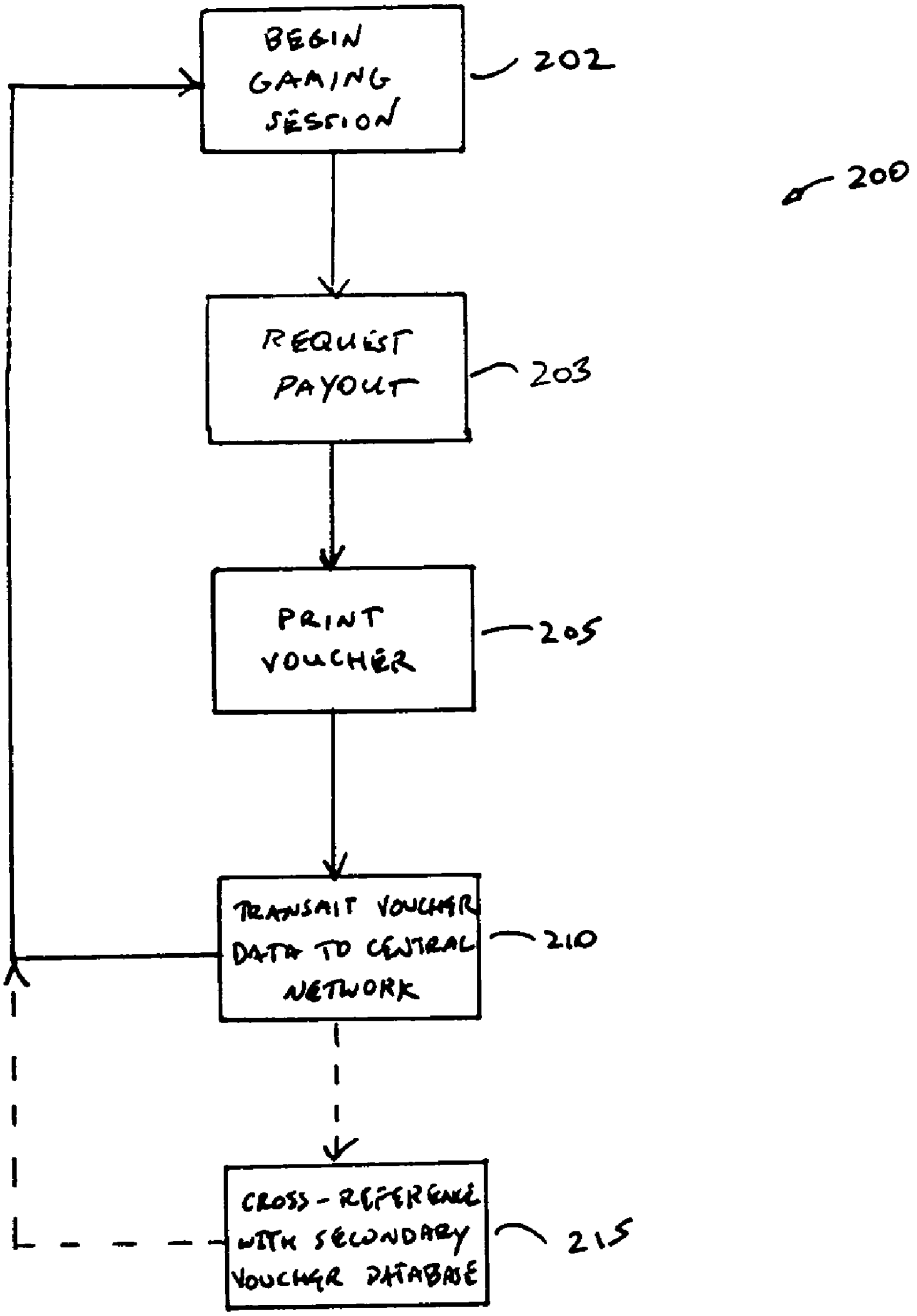
FIG. 2 is a flow diagram illustrating an example of generation of payment vouchers during a gaming session.
Figure 3:
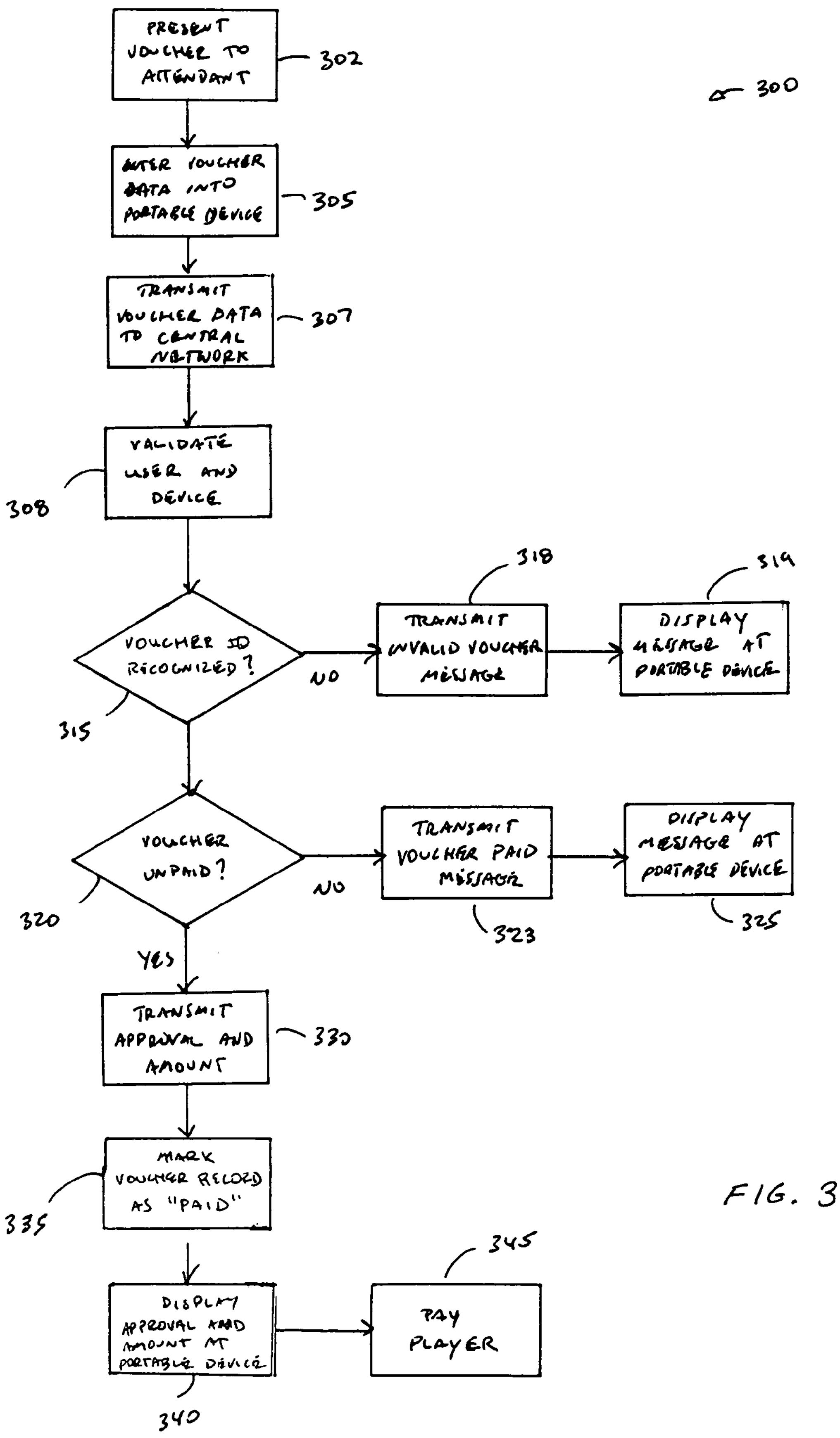
FIG. 3 is a flow diagram illustrating an example of a process for validating gaming vouchers as may be used, for example, in the system shown in FIG. 1.
Figure 6:
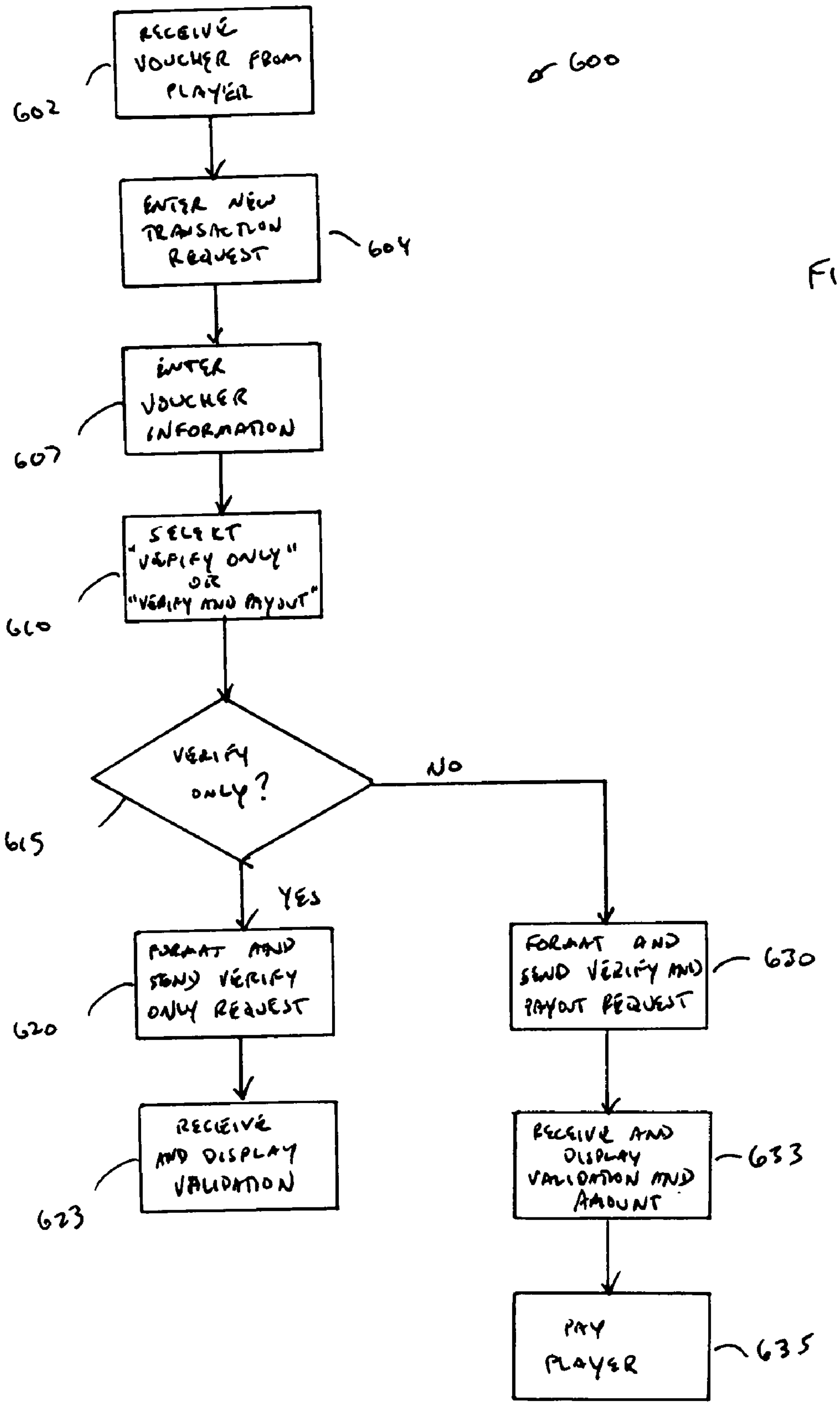
FIG. 6 is a flow diagram illustrating an example of a process for handling a voucher transaction using a wireless, portable computer device.

Further details of the operation of the gaming system 100 may be described with reference to the flow diagrams illustrated in FIGS. 2, 3 and 6. FIG. 2 is a flow diagram illustrating an example of generation of payment vouchers during a gaming session, as may be used, for example, in the gaming system 100 of FIG. 1, while FIG. 3 is a flow diagram illustrating an example of a process for validating gaming vouchers, as may be used, for example, in the gaming system 100 of FIG. 1. FIG. 6 is a flow diagram illustrating an example of a process for handling, from an operator perspective, a voucher transaction using a wireless, portable computer device. While the processes illustrated in FIGS. 2, 3 and 6 are generally described below in the context of the gaming system 100 of FIG. 1, it should be understood that they could be used in other gaming systems as well.

Turning first to FIG. 2, a process 200 for generating payment vouchers during a gaming session includes a first step 202 of beginning a gaming session by, for example, a player inserting coins or chips (or, in same gaming establishments, a credit device such as a credit card, magnetic strip card, or smart card) into an electronic gaming machine 105. When a player is ready to end a gaming session, then the player requests a pay-out, as indicated by step 204. In some cases the player may be presented with an option of receiving chips or printed voucher, and in other cases the player may simply receive a printed voucher when indicating a desire to end a gaming session. In step 205, the electronic gaming machine 105 prints out or otherwise dispenses the gaming voucher 110 for the player. In step 210 (which may be before or after step 205), the electronic gaming machine 105 transmits data regarding the printed voucher over a cable 109 to the central network computer system 102. The format of the voucher data depends upon the particular protocol used by the central network computer system 102, but may, for example, take the form of an electronic voucher record 108 that includes a machine identifier (machine ID, or "asset number") and a timestamp (date and time). The central network computer system 102 stores the data from the voucher record 108 in the voucher database 122, and may assigns the new entry in the database 122 a unique voucher record key 161 for facilitating storage and retrieval of database records. Each pay-out voucher 110 can be uniquely identified by the machine ID and timestamp, since no two vouchers will be printed out at the same time from the same machine 105, and therefore the combination of machine ID and timestamp may conveniently be used as a "ticket identifier" or "ticket ID." After the voucher 110 is printed out and the voucher record 108 transmitted to the central network computer system 102, the process 200 then repeats when another player begins a gaming session in step 202.

Figure 4:
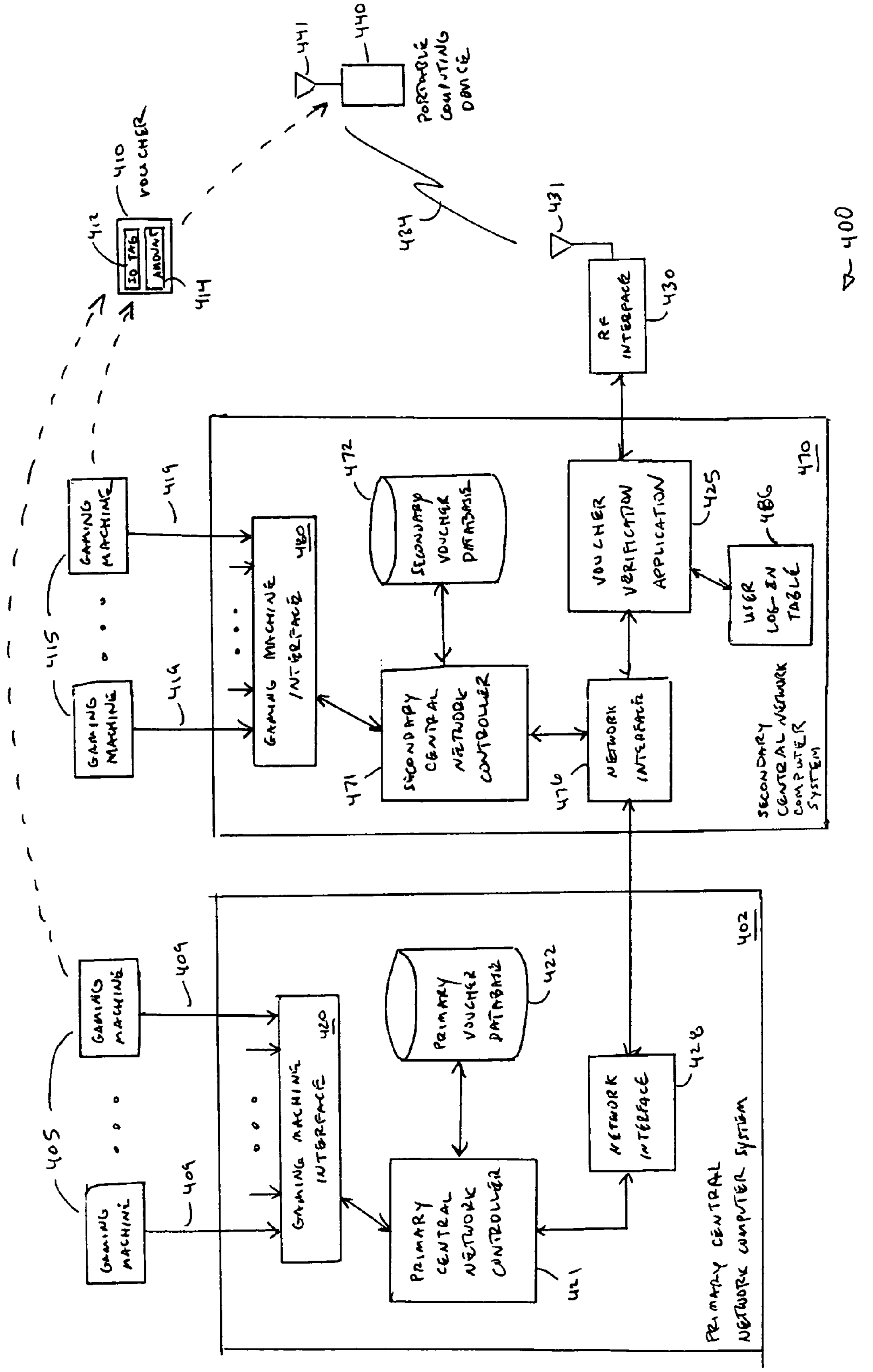
FIG. 4 is a block diagram of a multi-network system for wireless validation of payment vouchers from electronic gaming machines, with backup operability for situations in which the primary network (and hence the voucher database) is unavailable.

In the gaming system 400 shown in FIG. 4, described hereafter, an additional step 215 is carried out, whereby the voucher record data is forwarded to a secondary network and stored in a secondary voucher database, so as to create cross-referenced database records between a primary and secondary database. Details regarding this process are described later herein.

The printed voucher 110 may contain any of a variety of information on it. Preferably, the printed voucher 110 includes a ticket identifier 112 (which may include the machine ID and a timestamp, as sent in the voucher record 108 to the central network computer system 102), as well as a statement of the amount of the pay-out. The ticket identifier 112 may be duplicated as a bar code or other machine-readable indicia on the printed voucher 110 so as facilitate automated reading thereof. FIG. 6 is a flow diagram illustrating an example of a process for handling, from an operator perspective, a voucher transaction using a wireless, portable computer device. As shown in FIG. 6, in a first step 602, the player presents the printed voucher 110 to an attendant 150 who carries and operates the wireless, portable computer device 140. The attendant 150 then enters, via the data entry means 146 or otherwise, a new voucher validation transaction request, as indicated by step 604. For example, the attendant 150 may click (using a mouse or key) or select (using the stylus 145 or a key) an on-screen button designated for this purpose (i.e., "Validate Voucher"). In a preferred embodiment, two different validation processes are supported: verification only, and verification and pay-out. In some cases, step 604 may be combined with step 610, wherein the attendant 150 selects between "Verification Only" or "Verification and Pay-out" options. Thus, selection of either the "Verification Only" or the "Verification and "Pay-out option would indicate a request for a new voucher validation transaction.

In either situation, in step 607, the attendant 150 either manually enters the voucher information (e.g., machine ID and timestamp) through the data entry means 146 (e.g., keyboard, keypad or mouse) or stylus 145, or else causes the wireless, portable computer device 140 to read the machine-readable indicia on the printed voucher 110 (through an optical scanning or infrared input on the portable computer device 140). The attendant 150 then hits a "send" button (by making an on-screen selection or otherwise), to cause a voucher validation request 135 to be transmitted from the wireless, portable computer device 140 to the central network computer system 102 via the wireless communication channel 134, or else the wireless, portable computer device 140 is programmed to automatically transmit the voucher validation request 135 immediately over the wireless communication channel 134 after the appropriate voucher data is input or read. If the attendant 150 has selected a "Verification Only" request, then, as indicated in step 620, the wireless, portable computer device 140 formats and sends a verify-only request to the central network computer system 102. If on the other hand, the attendant 150 has selected the "Verification and Pay-out" option, then the wireless, portable computer device 140 formats and sends a verify-and-pay-out request to the central network computer system 102, as indicated by step 630.

The central network computer system 102 receives and processes the voucher verification or verification-and-pay-out request, and responds with an indication of whether the voucher is valid and, if a pay-out request, the amount to be paid out, as indicated by steps 623 and 633, respectively. The validation result and amount, if appropriate, are displayed on the display screen 142 for the attendant 150. If a verification-and-pay-out request is approved, then the attendant 150 pays the player the amount indicated.

FIG. 3 illustrates, from a more global perspective, a process 300 by which a player may obtain cash for a printed voucher 112, taking advantage of the wireless voucher validation system 100. Steps 302 through 307 in FIG. 3, in certain embodiments, generally correspond to steps 602 through 620 or 630 in FIG. 6, and therefore the explanation about regarding FIG. 6 is applicable here as well. Thus, as shown in FIG. 3, in a first step 302, the player presents the printed voucher 110 to an attendant 150 operating the wireless, portable computer device 140. As indicated by step 305, the attendant 150 either manually enters the voucher information (e.g., machine ID and timestamp) through the data entry means 146 (e.g., keyboard, keypad or mouse) or stylus 145, or else causes the wireless, portable computer device 140 to read the machine-readable indicia on the printed voucher 110 (through an optical scanning or infrared input on the portable computer device 140). The attendant 150 also preferably selects, from on-screen buttons or menu selections, or otherwise, which of the two operations—“Verification Only” or “Verification and Pay-out”—is desired. The attendant 150 then hits a “send” button (by making an on-screen selection or otherwise) to cause a voucher validation request 135 to be transmitted from the wireless, portable computer device 140 to the central network computer system 102 via the wireless communication channel 134, or else the wireless, portable computer device 140 is programmed to automatically transmit the voucher validation request 135 immediately over the wireless communication channel 134 after the appropriate voucher data is input or read. If the attendant 150 has selected a “Verification Only” request, then the wireless, portable computer device 140 formats and sends a verify-only request to the central network computer system 102. If on the other hand, the attendant 150 has selected the “Verification and Pay-out” option, then the wireless, portable computer device 140 formats and sends a verify-and-pay-out request to the central network computer system 102.

The voucher validation request 135 may include the voucher identification information (including the machine ID and time stamp), and further preferably includes a unique device ID (e.g., a unique TCP/IP address) which identifies the particular wireless, portable communication device 140 from which the request 135 originated. The voucher validation request data may be sent in any desired format or arrangement.

The voucher validation request 135 is received at the RF interface 130 and converted from wireless data to digital bits in a format useful to the central network computer system 102. At the central network computer system 102, the voucher verification application program 125 receives via the RF interface 130 and processes the data from the voucher validation request 135. Incoming voucher verification requests 135 may be queued and processed either according to a periodic polling scheme, or else in response to an interrupt generated by the RF interface 130 when a request 135 is received. Prior to looking up the voucher record, and as indicated by step 308, the voucher verification program 125 first verifies the requesting user and device. To do so, the voucher verification program 125 preferably uses the device ID to access the device table entry record in the user log-in table 126. If no device table entry record is found, then the transaction is denied and a denial message is returned, via the RF interface 130, to the wireless, portable computer device 140. If the device table entry record is found for the particular device ID appearing in the voucher validation request 135, then the voucher verification program 125 examines the user ID in the table entry record to ensure that a valid user is operating the portable, wireless computer device 140 and, preferably, that the user is within his or her permissible hours of operation of use. If these criteria are not met, then the transaction is denied and a denial message is returned, via the RF interface 130, to the wireless, portable computer device 140.

If the user and device validation procedures in step 308 are passed, then, in a next step 315, the voucher validation application program 125 looks up the corresponding voucher record in the voucher database 122. The voucher record may be looked up using the unique combination of machine ID and timestamp that were transmitted as part of the original voucher record 108 from the electronic gaming machine 105 to the central network computer system 102. Alternatively, the machine ID and timestamp may be used to obtain a voucher key number which is then used to access the voucher record in the voucher database 122. The voucher key number may, for example, be a unique sequential record number assigned when the particular voucher record is first stored in the voucher database 122.

If the voucher record is not found in the voucher database 122, then, as indicated by steps 318 and 319, an invalid voucher message is transmitted from the central network computer system 102, via the RF interface 130, to the wireless, portable computer device 140, where a suitable textual or graphical message is displayed for the attendant 150. If, on the other hand, the voucher record is located in the voucher database 122, then, as indicated by step 320, the voucher verification application program 125 checks the “paid” field 165 voucher record to determine whether or not the voucher has already been paid. If it has been paid, then, as indicated by steps 323 and 324, a voucher paid message is transmitted from the central network computer system 102, via the RF interface 130, to the wireless, portable computer device 140, where a suitable textual or graphical message is displayed for the attendant 150.

Assuming the voucher has not already been paid, then, as indicated by step 330, a transaction approval and a voucher amount are transmitted from the central network computer system 102, via the RF interface 130, to the wireless, portable computer device 140. An indication of the transaction approval (e.g., “Voucher Approved”) is displayed for the attendant 150 on the screen display 142 of the wireless, portable computer device 140, along with the voucher amount, as indicated by step 340. Transmission of the voucher amount helps prevent fraud on the part of the player, by, for example, physical alteration of the amount appearing on the printed voucher 110. When seeing that the voucher has been approved, the attendant pays the player, as indicated by step 345.

At the central network computer system 102, in connection with transmitting the voucher approval and amount to the wireless, portable computer device 140, the voucher validation application program 125 also updates, if appropriate, the “paid” field 165 in the particular voucher record stored in the voucher database 122 (step 330). More specifically, if the validation request was for both verification and pay-out, then the paid field 165 of the voucher record is updated to reflect the fact that the voucher 110 has been paid out to the player. If there is a subsequent attempt to cash the same voucher 110, the voucher validation application program 125 will detect the fact that the voucher 110 has already been paid out, and will disapprove the transaction.

From time to time, an accounting and/or tracking batch process may be run at the central network computer system 102, to evaluate the history of voucher pay-outs and perform any processing of voucher information deemed desirable.

It is therefore apparent that the wireless voucher validation system 100 provides an effective, secure and user-friendly means for players to obtain pay-out for printed vouchers 110 received from electronic gaming machines 105, without the players being required to travel to a cashier kiosk or locate a stationary automated voucher validation machine.

Communication between the central network computer system 102 and the many wireless, portable computer devices 140 that may be used in the system 100 may be carried out according to any multiple user communication protocol. Transmissions from different sources may be distinguished by different source identification codes (e.g., device IDs), different assigned time slots, different frequencies, or different spreading codes, or any combination thereof. Even with many wireless, portable computer devices 140 being used in the same local area, the actual transmissions are expected to be brief and sporadic, so collisions between transmissions are unlikely. Should a collision occur (as indicated, for example, by the failure to receive an acknowledge message, or by the recipient transmitting a failed message signal), then the wireless, portable computer device 140 may back off for a random period of time (based in part on the device ID) and then try again.

FIG. 4 is a block diagram of a multi-network system 400 for wireless validation of payment vouchers from electronic gaming machines 405. In the multi-network system 400 shown in FIG. 4, a primary central network computer system 402 and a secondary central network computer system 470 are connected and communicate through network interfaces 428 and 476. The primary central network computer system 402 is connected to a number of electronic gaming machines 409 through a gaming machine interface 420, and the secondary central network computer system 470 is also connected to a number of electronic gaming machines 415 through a gaming machine interface 480. The primary central network computer system 402 comprises a primary central network controller 421 connected to the gaming machine interface 420, the network interface 428, and a primary voucher database 422. Similarly, the secondary central network computer system 470 comprises a secondary central network controller 471 connected to the gaming machine interface 480, the network interface 476, and a secondary voucher database 472. The network interface 476 in the secondary central network computer system 470 also preferably interfaces with a voucher verification application program 425, which is connected to an RF interface 430 and a user log-in table 486.

The RF interface 430 communicates with various wireless, portable computer devices (such as 440) in much the same manner as previously described with respect to the system 100 illustrated in FIG. 1. The wireless, portable computer device 440 may generally be similar to the device 140 shown in FIG. 1 (i.e., having a screen display, data entry means, etc.), but its details are not shown in FIG. 4 merely for the sake of simplification. Voucher information from a printed voucher 410 may be entered into the wireless, portable computer device 440 by an operator or attendant, and transmitted to the primary/secondary central computer network(s) for verification. When a voucher is validated, the wireless, portable computer device 440 receives the validation and displays an indication thereof (and the pay-out amount, if appropriate) to the operator or attendant.

The overall functionality of the multi-network wireless voucher validation system 400, from the perspective of attendants and operators using a wireless, portable computer device 440, is similar to that of the wireless voucher validation system 100 illustrated in FIG. 1. However, the multi-network wireless voucher validation system 400 further provides the possibility of manual wireless voucher validation when the primary voucher database 422 is inaccessible for any reason (e.g., such as when the primary central network computer system 402 is off-line or unavailable), or, in some embodiments, when neither the primary voucher database 422 nor the secondary voucher database 472 is available. Thus, in one aspect, the secondary central network computer system 470 provides a measure of backup operability for situations in which the primary voucher database 422 and/or primary central network computer system 402, and possibly the secondary voucher database 472, is/are unavailable.

Similar to system 100 of FIG. 1, electronic gaming machines 405 and 419 which dispense printed vouchers also transmit a voucher record to the primary central network computer system 402 or the secondary central network computer system 470, respectively, depending upon which system 402, 470 the electronic gaming machine is connected to. Voucher records received at the primary central network computer system 402 are stored in the primary voucher database 422, and are also relayed by the primary central network controller 421 to the secondary central network computer system 470 via the network interfaces 428, 476. The voucher record is then also stored in the secondary voucher database 472. Conversely, voucher records received at the secondary central network computer system 470 are stored in the secondary voucher database 472, and are also relayed by the secondary central network controller 471 to the primary central network computer system 402 via the network interfaces 428, 476. The voucher record is then also stored in the primary voucher database 422.

Figure 5:
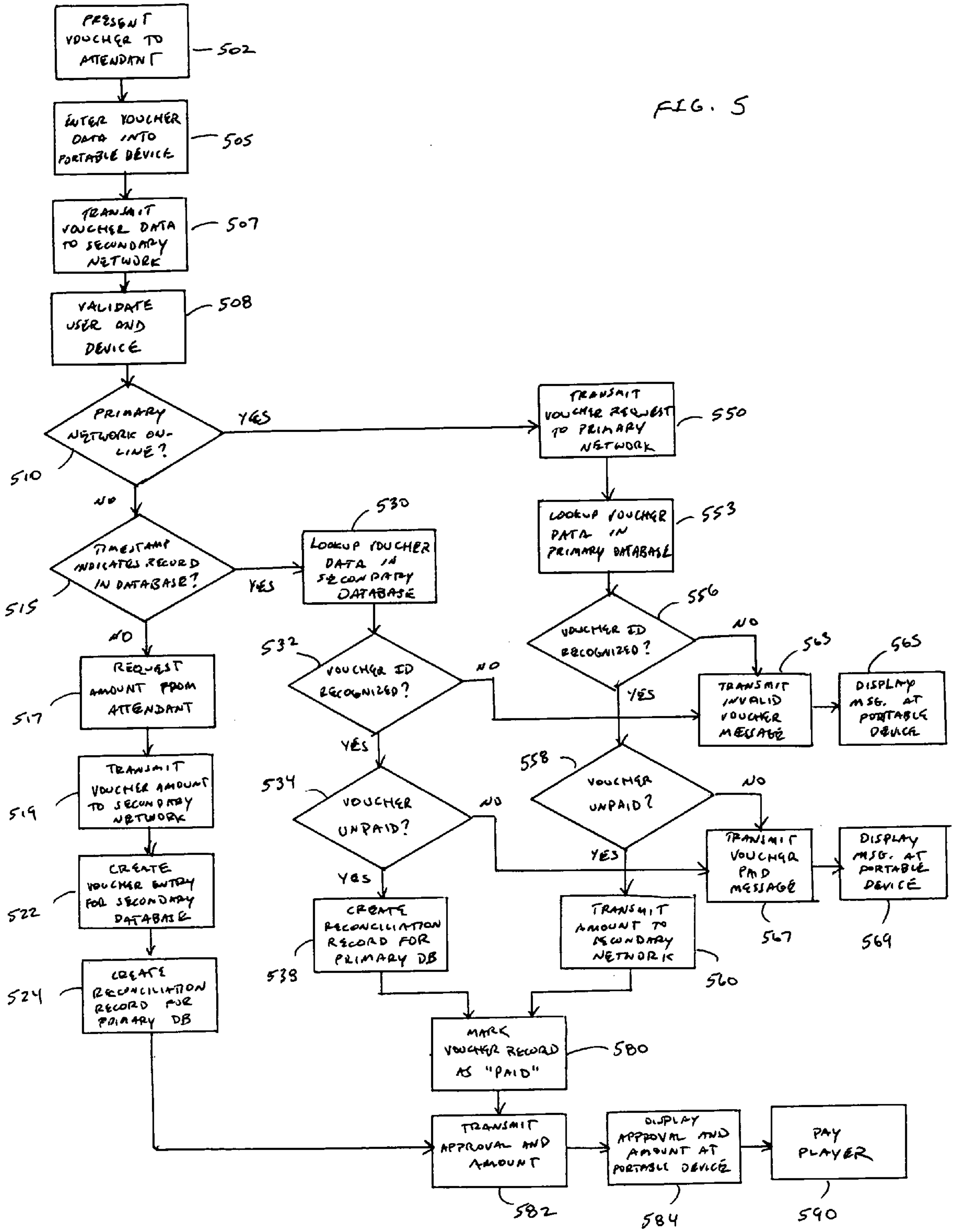
FIG. 5 is a flow diagram illustrating an example of a process for validating gaming vouchers in a system such as illustrated in FIG. 4, where either on-line or off-line validation is supported.

One example of operation of the multi-network wireless voucher verification system 400 may be described with respect to the flow diagram of FIG. 5. In the wireless voucher verification process 500 illustrated in FIG. 5, the first several steps 502, 505, 507 and 508 are similar to steps 302, 305, 307 and 308 illustrated in FIG. 3, and the details of are not repeated here. However, it should be pointed out that the voucher information is received by only one of the two network computer systems (in this example, the secondary central network computer system 470, as it is connected to the RF interface 430). Further processing depends on whether or not the primary central network computer system 402 is on-line, or else is off-line or otherwise unavailable. If the primary central network computer system 402 is on-line, then the process moves to step 550, wherein the secondary central network computer system 402, which has received the voucher verification request, transmits the voucher request to the primary network. Then, as indicated by step 553, the corresponding voucher record is looked up from the primary voucher database 422, using techniques similar to those described previously with respect to FIGS. 1 and 3. If the voucher record is not found, then a message to that effect is conveyed back to the secondary central network computer system 470 and, as indicated by steps 563 and 565, an invalid voucher message is transmitted back to the wireless, portable computer device 440.

If, on the other hand, the corresponding voucher record is found, then the primary central network controller 421 checks to determine whether the voucher record indicates that the voucher has been paid. If so, then a message to that effect is conveyed back to the secondary central network computer system 470 and, as indicated by steps 567 and 569, an voucher already paid message is transmitted back to the wireless, portable computer device 440. Assuming the voucher has not yet been paid, a message to that effect, as indicated by step 560, is conveyed back to the secondary central network computer system 470, which, as indicated by step 582, transmits a verification approval along with the voucher amount back to the wireless, portable computer device 440 for display. The voucher paid field in the voucher record is updated to reflect that the voucher has been cashed out.

If the primary central network computer system 402 is not on-line or is otherwise unavailable, then, as indicated by step 515, the secondary central network computer system 470 may make a determination as to whether a corresponding voucher record can nevertheless be found in the secondary voucher database 472. By examining the timestamp information in the voucher verification request (that is, the original timestamp of when the voucher was printed, which is part of the original voucher record), and possibly the machine ID (indicating the originating gaming machine), the secondary central network controller 471 may determine if the voucher record is likely to be found in the secondary voucher database 472, based upon knowledge of when the primary network controller may have become unavailable and the knowledge of which electronic gaming machines are connected to which records. However, in certain alternative embodiments, step 515 can be bypassed, and a search of the secondary voucher database 472 may be conducted without any sort of pre-screening.

If the voucher record should be in the secondary voucher database 472, but a corresponding voucher record cannot be found, then the process 500 branches once again to steps 563 and 565, whereby an invalid voucher message is transmitted to the wireless, portable computer device 440 for display. If the voucher record is found, then, as before, the secondary central network controller 471 ensures that the voucher paid field indicates that the voucher is unpaid. If so, the secondary central network controller 471 creates a voucher reconciliation record (to be used for the primary voucher database 422 when the primary central network computer system 402 later becomes available), then marks the voucher as “paid” in the secondary voucher database 472, and transmits a voucher approval and amount to be paid to the wireless, portable computer device 440 for display.

If the primary central network computer system 402 is off-line or unavailable, and the voucher record is not in the secondary voucher database 472, then, nevertheless, the wireless voucher verification system 400 may still allow processing of the voucher. Because the amount of pay-out was not looked up from a voucher database, the amount is needed by the secondary central network computer system 470 for handling of the voucher transaction. Therefore, as indicated by step 571, the secondary central network computer system 470 transmits a request to the operator or attendant to enter the voucher amount into the wireless, portable computer device 440. When the operator or attendant has done so, the voucher amount information is transmitted from the wireless, portable computer device 440 to the secondary central network computer system 402. The voucher verification application program 425 then creates a new voucher record and stores it immediately in the secondary voucher database 472, indicating that the voucher has been paid. If an attempt is made thereafter to cash the same voucher, the voucher record will be found and the transaction prevented. The voucher verification application program 425, as indicated by step 524, also creates a reconciliation record for the primary voucher database 422, to be conveyed to the primary central network computer system 402 when it once again becomes available. An approval or acknowledgment of the voucher transaction is transmitted back for display on the wireless, portable computer device 440, and the attendant or operator may then pay the player.

While preferred embodiments of the invention have been described herein, many variations are possible which remain within the concept and scope of the invention. Such variations would become clear to one of ordinary skill in the art after inspection of the specification and the drawings. The invention therefore is not to be restricted except within the spirit and scope of any appended claims.

What is claimed is:

1. A method for on-line or off-line validation of gaming pay-out vouchers dispensed from an electronic gaming machine, said method comprising the steps of:

receiving voucher identification information at a wireless, portable computer device, said voucher identification information corresponding to a pay-out voucher dispensed from an electronic gaming machine;

transmitting, over a wireless connection, a voucher validation request from the wireless, portable computer device to a remote wireless interface, said remote wireless interface connected to a central network computer;

conveying the voucher validation request from the remote wireless interface to the central network computer;

attempting to retrieve a voucher record in a voucher database based upon said voucher identification information;

confirming, if said voucher record was retrieved, that the corresponding pay-out voucher has not yet been paid based on payment information in said voucher record, and transmitting, via said remote wireless interface, a voucher pay-out approval from said central network computer to said wireless, portable computer device if the pay-out voucher was not yet paid, or else a voucher pay-out disapproval if the pay-out voucher was already paid;

displaying, if said voucher record was retrieved, an indication of said voucher pay-out approval or voucher pay-out disapproval on-screen at said wireless, portable computer device;

transmitting, if said voucher record could not be retrieved, a voucher record unavailable indication from said central network computer, via said remote wireless interface, to said wireless, portable computer device;

receiving said voucher record unavailable indication at said wireless, portable computer device and, in response thereto, displaying a message;

receiving a voucher amount via a user interface of said wireless, remote computer device after displaying said message;

transmitting said voucher amount and said voucher identification information, via said wireless interface, to said central network computer from said wireless, portable computer device; and preparing a voucher database reconciliation record at said central network computer for updating said voucher database at a subsequent time to reflect that the pay-out voucher has been paid.

2. The method of claim 1, further comprising the step of, in connection with transmitting said voucher pay-out approval to said wireless, portable computer device, updating said voucher record to indicate that the pay-out voucher has been paid.

3. The method of claim 1, further comprising the steps of:

reading a pay-out amount from said voucher record;

transmitting, along with said voucher pay-out approval indication, said pay-out amount from the central network computer to said portable computer device via said remote transmitter; and displaying said pay-out amount at said portable computer device.

4. The method of claim 1, further comprising the steps of: transmitting from an electronic gaming machine, when the pay-out voucher is initially dispensed, said voucher identification information and the pay-out amount to said central network computer; and creating and storing a voucher record in said voucher database in response to said voucher identification information.

5. The method of claim 4, wherein said voucher identification information comprises a machine identifier and a time stamp indicating a time at which the pay-out voucher was initially dispensed.

6. The method of claim 1, wherein said wireless, portable computer device comprises a personal digital assistant.

7. A system for on-line or off-line validation of gaming pay-out vouchers dispensed from an electronic gaming machine, comprising:

a wireless, portable computer device having a display and a user interface;

a central network computer;

a remote wireless interface communicatively coupled to said central network computer; and a pay-out voucher database communicatively coupled to said central network computer;

wherein said wireless, portable computer device is configured to receive, via said user interface, voucher identification information corresponding to a pay-out voucher dispensed from an electronic gaming machine, and to transmit, over a wireless connection, a voucher validation request to said remote wireless interface;

wherein said remote wireless interface is configured to convey the voucher validation request to the central network computer;

wherein said central network computer is configured:

(i) to attempt to retrieve a voucher record in said voucher database based upon said voucher identification information and, if found and unpaid, transmitting a voucher pay-out approval to said wireless, portable computer device; and (ii) to transmit, if said voucher record is unavailable, a voucher record unavailable indication to said wireless, portable computer device via said remote wireless interface;

wherein said wireless, portable computer device is further configured to present a message upon receiving said voucher record unavailable indication, to receive a voucher amount via said user interface as a result of receiving said voucher record unavailable indication, and to transmit said voucher amount to said central network computer; and wherein said central network computer is further configured to prepare a voucher database reconciliation record at said central network computer for updating said voucher database at a subsequent time to reflect that the pay-out voucher has been paid.

8. The system of claim 7, wherein said central network computer is further configured to update said voucher record, in connection with transmitting said voucher pay-out approval to said wireless, portable computer device, to indicate that the pay-out voucher has been paid.

9. The system of claim 7, wherein:

said central network computer is further configured to read a pay-out amount from said voucher record and to transmit, along with said voucher pay-out approval indication, said pay-out amount to said portable computer device; and said wireless, portable computer device is configured to display said pay-out amount.

10. The system of claim 7, further comprising at least one electronic gaming machine configured to convey said voucher identification information and the pay-out amount to said central network computer when the pay-out voucher is initially dispensed;

wherein said central network computer is further configured to create and store a voucher record in said voucher database in response to said voucher identification information.

11. The system of claim 10, wherein said voucher identification information comprises a machine identifier and a time stamp indicating a time at which the pay-out voucher was initially dispensed.

12. The system of claim 7, wherein said wireless, portable computer device comprises a personal digital assistant.

* * * * *